United States Patent [19]

Garsten et al.

[11] 4,067,468

[45] Jan. 10, 1978

[54] METHOD OF DISTRIBUTING CARGO

[76] Inventors: Carl-Johan Garsten, Drottninggatan 176 B, Helsingborg, Sweden, S-252 33; Jan V. Grewin, Bergvagen 29, Huddinge, Sweden, S-141 71

[21] Appl. No.: 617,027

[22] Filed: Sept. 26, 1975

[30] Foreign Application Priority Data

Oct. 11, 1974 Sweden .............................. 74128109

[51] Int. Cl.² ............................................. B65G 67/58
[52] U.S. Cl. ....................................... 214/152; 214/14
[58] Field of Search ....................... 214/152, 15 R, 14; 114/121, 73

[56] References Cited

U.S. PATENT DOCUMENTS

| 2,988,036 | 6/1961 | Mooneyhan et al. | 214/15 R |
| 3,291,324 | 12/1966 | Fulcher et al. | 214/15 R |
| 3,329,808 | 7/1967 | Fisher | 214/14 X |
| 3,669,288 | 6/1972 | Young | 214/152 |
| 3,836,026 | 9/1974 | Peterson | 214/152 |

Primary Examiner—Robert G. Sheridan

Attorney, Agent, or Firm—John J. Dennemeyer

[57] ABSTRACT

A method of distributing cargo for loading and discharging cargo spaces of unequal size based on information of the cargo volume to be loaded at each loading area and of its destination, or of an estimate of this factor which is gradually adjusted to actual values, consists in loading the same or a larger quantity of cargo in the largest cargo space or spaces as in any of the smaller cargo spaces, and placing during loading the portion of the cargo volume intended for each discharge berth in such a manner that the largest cargo spaces will contain the same or a larger quantity of cargo in this portion of the cargo volume than the smaller cargo spaces. If cargo is lacking to fill all the cargo spaces the loading is carried out in such a manner that the total cargo volume to be loaded in different cargo spaces is distributed among the cargo spaces having the nearest size, and loading and discharge is always carried out in the largest cargo spaces simultaneously with loading and discharging in one or more of the other cargo spaces.

1 Claim, 5 Drawing Figures

METHOD OF DISTRIBUTING CARGO

The present invention relates to a method of distributing cargo for the loading and discharge of mutually connected cargo spaces of unequal size carried out with a required number of manual or mechanical work units.

According to previously known methods to load and discharge, for instance holds of unequal size in a vessel which is to call at different ports, it has been attempted to distribute the cargo goods as equally as possible either for all the loading ports or for all the discharge ports.

This distribution of the cargo causes a great time loss when the loading and discharge is not planned simultaneously. If only the loading is planned a great time loss may arise at the discharge when the cargo has not been planned to lie as equally distributed as possible for the discharge, and if only the discharge is planned a great time loss may arise during loading if attention is not paid to discharge the cargo as equally as possible.

The object of the present invention is to eliminate this disadvantage by means of a new method to distribute cargo as defined in the accompanying claim.

The method according to the invention which will be more specifically described below, may be applied to the loading and discharge of goods of mutually connected cargo spaces of unequal size, such as holds in a vessel or cargo spaces in a vehicle or spaces in a goods depot. At the loading and discharge the necessary number of working units should be available, such as loading and discharging equipment adapted to the work, or in the case of a manual loading and discharge of vessels, the necessary number of stowage teams.

The method according to the invention pre-supposes knowledge of the volume of goods to be loaded at each loading area and the destination thereof, or an estimate of this factor which then is gradually adjusted to actual values. The method according to the invention is carried out in that the same quantity or more of the goods is loaded in the largest cargo space or spaces than is loaded in any of the smaller cargo spaces, and at this loading the portion of the cargo volume intended for each discharging berth is placed in such a manner that the largest cargo space or spaces will have the same quantity of goods or more of this portion of the cargo volume than the smaller cargo spaces, and furthermore in that if cargo is lacking to fill up all of the cargo spaces, the loading is carried out in such a manner that the total cargo volume to be loaded in the several cargo spaces will be distributed among the several cargo spaces in as equal a size as possible, and further in that loading and discharge always is carried out in the largest cargo space or spaces at the same time as loading and discharge takes place in one or more of the other cargo spaces.

When the method described above is applied it is seen that the largest cargo volume loaded in any cargo space from a certain loading area will determine the total time of loading at this place, provided that the loading of the other cargo spaces takes place during the same period of time. Thus when loading is always going on in the largest cargo space at each loading area the size of this cargo space will determine the shortest time required to load all of the cargo spaces. The same condition applies to the discharge.

DESCRIPTION OF THE PREFERRED EMBODIMENT

Figure 1:
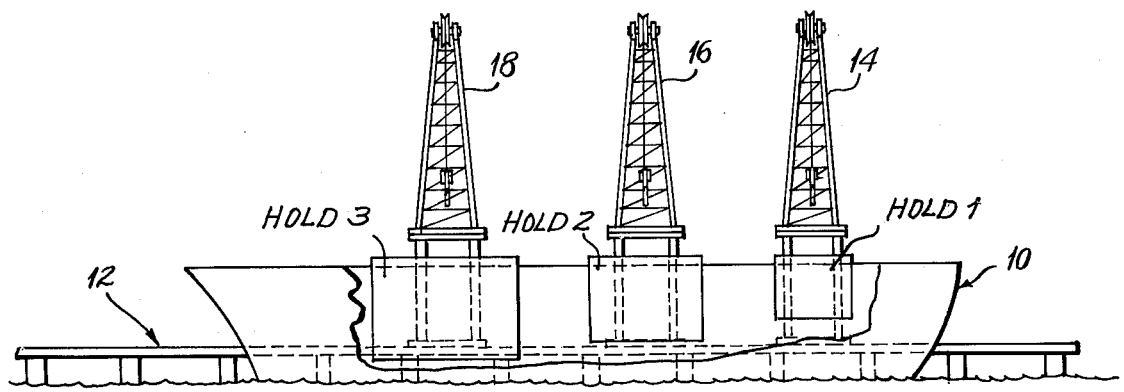
FIG. 1 is a fragmentary, pictorial view showing a vessel anchored at a dock, the vessel including three cargo holds of different sizes, and the dock having cargo loading and discharging equipment for each hold.

It has already been stated that the present method may be applied to the loading and discharge of cargo of different kinds, utilizing various types of vessels and numbers of ports. In order to facilitate describing the present method, however, a typical example of a cargo vessel, size of cargo, and number of ports has been selected.

Referring now to the drawings, a vessel is indicated generally at 10, having three different cargo spaces identified as hold 1, hold 2 and hold 3. Obviously, the kind of vessel or vehicle employed can be varied, as can the number of different cargo spaces.

In FIG. 1 the vessel 10 is shown anchored at a dock 12. As has been stated, it is necessary that each loading and discharging dock have adequate materials handling equipment and/or labor to effectuate simultaneous loading and discharge of all the cargo spaces utilized to carry out the present method. In FIG. 1, therefore, separate loading cranes 14, 16 and 18 are shown, for the holds 1, 2 and 3, respectively. Should the vessel have additional cargo spaces, then additional material handling apparatus would be required, so that all holds utilized to carry out the invention can be loaded or discharged at the same time, in all ports.

Figure 2:
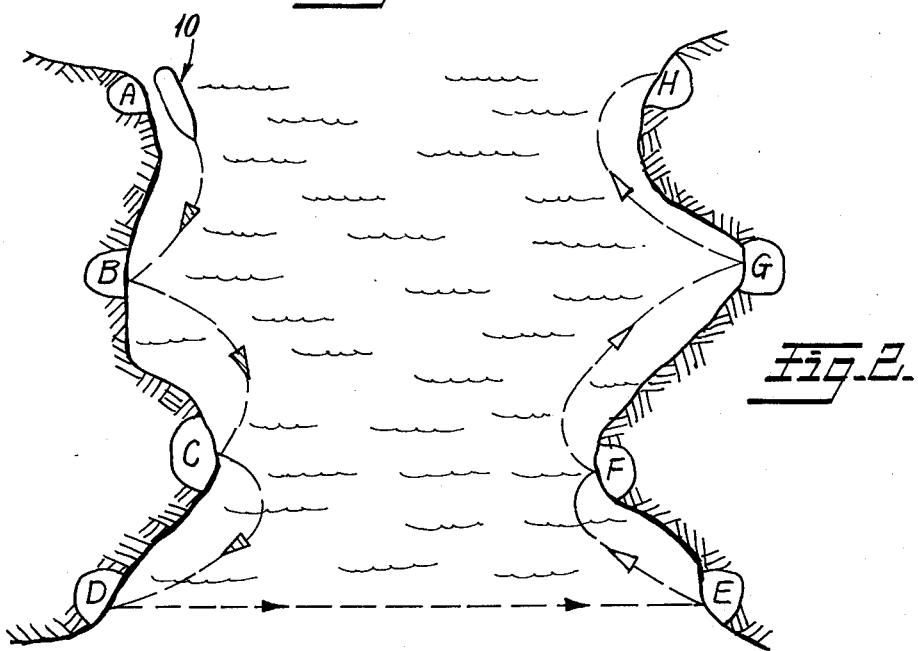
FIG. 2 is a diagrammatic view showing four loading ports and four discharge ports for the vessel of FIG. 1, with the path of the vessel from port to port being indicated by the broken line.

It is intended that the vessel 10 move in sequence to a plurality of loading ports, and then in sequence to a plurality of discharging ports. In the example chosen, four loading ports are indicated and are identified as ports A, B, C and D. Similarly, there are four discharging ports identified as E, F, G and H. Referring to FIG. 2, the movement of the vessel 10 in sequence to the loading ports A, B, C and D and the discharging ports E, F, G and H is shown in diagrammatic form.

In order that the method may be fully explained, it will be helpful to indicate typical cargo volumes for the holds 1, 2 and 3, and to select an example of the size of the total cargo to be transported. Therefore, for purposes of description, it will be assumed that hold 1 is of a size to accommodate 10 units of cargo, hold 2 of a size to accommodate 20 units of cargo, and hold 3 of a size to accommodate 25 units of cargo. Further, it will be assumed that a total cargo of 48 units is to be transported from the four loading ports A, B, C and D to the four discharging ports E, F, G and H. Obviously, these values are presented only as an example for explanation purposes.

It is apparent that the total amount of cargo to be transported cannot exceed the total cargo space available. When the amount of cargo to be transported equals the amount of available space, then the cargo ideally will be distributed so that all of the space is filled. Usually, however, the cargo to be transported will amount to less than the space available, and that is the instance with the cited example.

Figure 3:
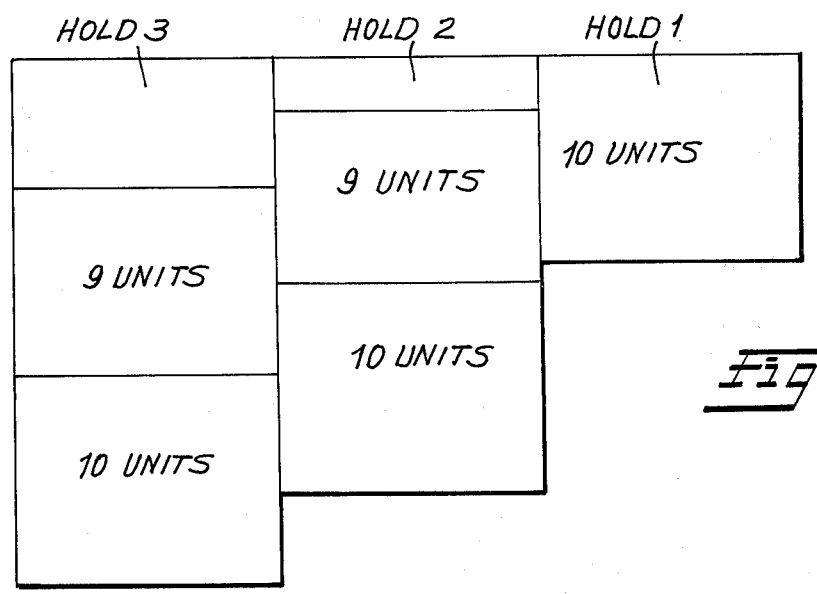
FIG. 3 is a diagrammatic view of the three cargo holds of the vessel of FIG. 1, showing how cargo units are proportioned to the three holds in the initial hold reduction process of the invention, for a particular load example.

If all of the cargo spaces (the holds 1, 2, and 3, for the given example) cannot be filled up the cargo spaces should be "reduced" as follows:

The work is started by a reduction of the largest cargo space hold 3 in the drawings, until it has the same size as the second largest cargo space, hold 2 in the drawings, after which the work is continued by reduction of the two largest cargo spaces (holds 3 and 2) until they have the same volume as the third largest cargo space (hold 1) etc., until the total volume of the cargo spaces thus obtained is equal to the existing cargo. Referring now to FIG. 3 of the drawing, the results of this "reducing" process for the holds 1, 2 and 3 and the assumed cargo of 48 units is shown in diagrammatic form. Hold 1 has been allocated 10 cargo units, and holds 2 and 3 have been allocated 19 cargo units, each.

In order to find the position of the goods so that the time for loading and discharge will be the shortest possible, loading and discharge must be planned at the same time. A method for this purpose is therefore to set an upper limit for the volume of goods allowed to be put into each cargo space at each loading area and at the same time to find an upper limit for the goods volume which should lie in each cargo space to each discharging berth. The sum of the upper limits at loading and discharge should both be equal to the volume of the largest cargo space.

In the calculation of these upper limits such factors as the capacity of the loading or discharge areas and the distances between the areas may be taken into consideration. If none of these limits has been exceeded at the loading, the cargo will lie in such a manner that loading and discharge will take place with the shortest possible delay.

A suitable manner for the distribution of goods at the loading of a vessel is more exactly explained herebelow, as applied to the given example having four loading ports, four discharge ports, and a total cargo of 48 units to be distributed into the holds 1, 2 and 3.

In the following table each row represents a loading port and each column represents a discharge port. At the intersection of each row and column is indicated the goods volume (in suitable units) which should be transported from the loading port of the respective row to the discharge port of the respective column.

| Loading Port | Discharge port | | | | Sum of the Row |
|---|---|---|---|---|---|
| | E | F | G | H | |
| A | 2 | — | 8 | 3 | 13 |
| B | — | 3 | 4 | 6 | 13 |
| C | 4 | 5 | 3 | 2 | 14 |
| D | 2 | — | 1 | 5 | 8 |
| Sum of the Column | 8 | 8 | 16 | 16 | |

The total goods volume is 48 units. The vessel 10 which shall be loaded has a total accommodation for 55 units distributed over three holds 1, 2, and 3 for 25, 20 and 10 units. Since the vessel will not have full cargo the holds must be "reduced", as mentioned above. The "new" holds will accomodate 19, 19 and 10 units as explained above and as shown in FIG. 3.

The most effective way to carry out loading in a port is to place the same quantity of cargo in each of the cargo spaces, that is in this case 13/3, 13/3, 14/3 and 8/3 units from the respective loading port. More specifically, assuming the vessel 10 with its three cargo holds 1, 2 and 3, the most effective way to load the holds is to divide the cargo to be loaded at each port A, B, C and D by the number of holds available, or in this example by 3, so that each hold receives an identical amount. Then, by simultaneously using the cranes 14, 16 and 18, the total loading time at each port would be at a minimum. Unfortunately, these idealized conditions are seldom present, and here the different capacities of the holds 1, 2 and 3, a normal condition, require that a different procedure be followed. In this case each hold must accomodate 10 load units. In certain loading ports therefore the goods quantity for the larger holds must be increased, in the present case by 3 units for the two largest holds. It does not matter which loading port or ports are used to increase the goods quantity. The cargo allotted the largest hold or holds in each port is now the upper limit for the cargo in any other hold in the port in question. Thus for instance, the values 5, 5, 6 and 3 may be used as upper limits at loading because the total thereof is 19 units, that is equal to the volumes of the largest holds.

According to the same consideration the upper limits for the discharge ports will be for instance, 3, 3, 7 and 6 units. It will be seen that these values again total 19 units.

Each hold 1, 2 and 3 may be represented by a table in which the rows and columns have the same significance as in the above table. It is now the question of shifting the goods volume at each intersection between a row and a column to the tables representing holds. This goods volume is placed in one of these tables or distributed to some of these tables, so that the upper limits for the row and column in question will not be exceeded and the holds will be allotted the goods volume assigned to them. The following tables indicate a possible distribution of the goods:

| | | Upper limits | | | | |
|---|---|---|---|---|---|---|
| | Loading port | 3 | 3 | 7 | 6 | |
| Hold 3 | A | 1 | — | 3 | 1 | 5 |
| total volume 25 units | B | — | 3 | 2 | — | 5 upper |
| "new" volume 19 units | C | 2 | — | 2 | 2 | 6 limits |
| | D | — | — | — | 3 | 3 |
| | discharge port | E | F | G | H | |

| | | Upper limits | | | | |
|---|---|---|---|---|---|---|
| | loading port | 3 | 3 | 7 | 6 | |
| Hold 2 | A | — | — | 5 | — | 5 |
| total volume 20 units | B | — | — | 1 | 4 | 5 upper |
| "new" volume 19 units | C | 2 | 3 | 1 | — | 6 limits |
| | D | 1 | — | — | 2 | 3 |
| | discharge port | E | F | G | H | |

| | | Upper limits | | | | |
|---|---|---|---|---|---|---|
| | loading port | 3 | 3 | 7 | 6 | |
| Hold 1 | A | 1 | — | — | 2 | 5 |
| total volume 10 units | B | — | — | 1 | 2 | 5 upper |
| "new" volume 10 units | C | — | 2 | — | — | 6 limits |
| | D | 1 | — | 1 | — | 3 |
| | discharge port | E | F | G | H | |

Figure 4:
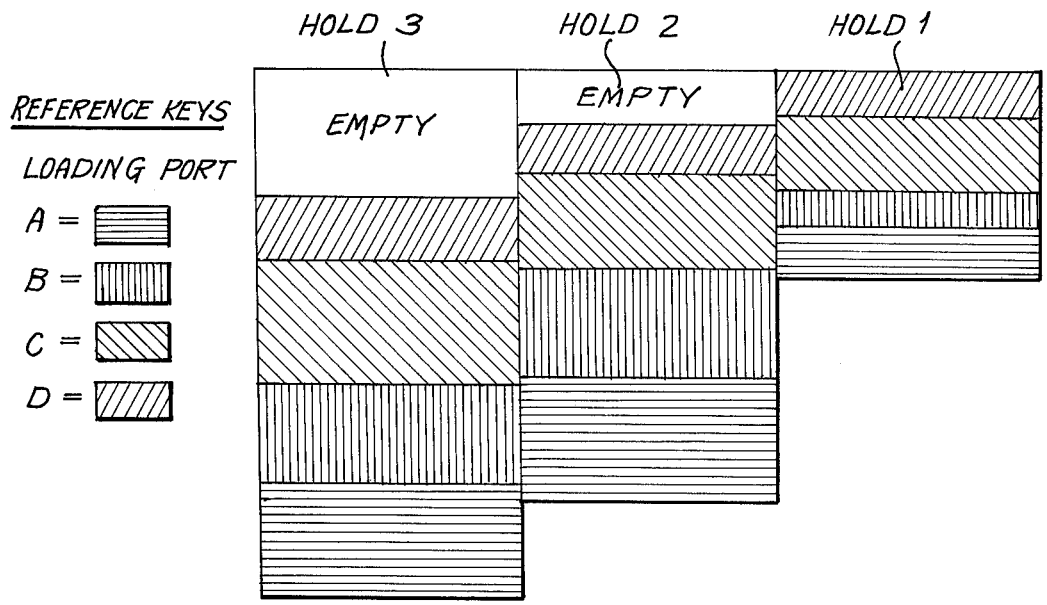
FIG. 4 is a diagram showing how the cargo dispersion to the three holds appears from the viewpoint of the loading ports, for the particular load example of FIG. 3.

According to the loading sketch of FIG. 4, cargo has been loaded and distributed to different cargo spaces or holds 1, 2 and 3 according to the above examples. As appears from FIG. 4, the largest cargo space (3) has the same quantity or more of the goods from a certain loading area than the smaller cargo spaces (2 and 1).

For the sake of simplicity the cargo from the loading area in question has been collected at one square but in fact it may be spread over the total cargo space in question.

Figure 5:
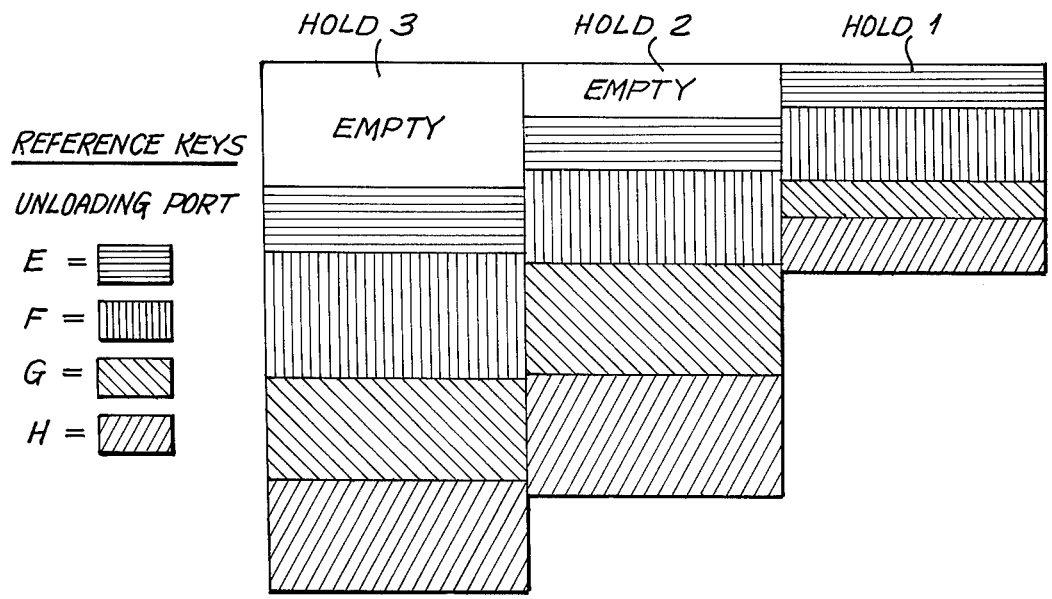
FIG. 5 is a diagram similar to FIG. 4, but showing the cargo dispersion from the viewpoint of the discharge ports.

According to the discharge sketch of FIG. 5, the cargo moreover has been distributed to a specific destination. As appears from FIG. 5, the largest cargo space has the same quantity or more of the goods to a specific destination than the smaller cargo spaces.

The sketches of FIGS. 4 and 5 illustrate the example stated above, in which the cargo is not sufficient to completely fill the cargo spaces. If cargo is lacking to fill up all of the cargo spaces, a free space is left in the largest cargo space until the portion occupied by cargo of this cargo space is equal to the portion occupied by cargo of the second largest cargo space, and then free space is continued to be left in the two largest cargo spaces until the occupied portion of these cargo spaces is equal to the occupied portion of the third largest cargo space etc.

The examples described above with regard to the distribution of goods at the loading of vessels also may be applied to the loading and discharge of cargo spaces in mobile units or depots.

What is claimed is:

1. A method for loading cargo into and discharging it from a plurality of mutually connected cargo spaces of unequal size, whereby to minimize the time required both for the loading operation(s) and the subsequent discharge operation(s), comprising the steps of:

dividing the cargo to be loaded at each loading place of a series of sequentially utilized loading places into a plurality of separate portions corresponding to said plurality of cargo spaces, the quantity of the cargo portion intended for the largest cargo space(s) being the same or larger than the quantity of the cargo portion intended for any of the smaller cargo space(s), and the quantity of the cargo loaded at each loading place in said series of sequentially utilized loading places and destined for the same discharging place in a series of sequentially utilized discharging places being distributed among said separate cargo portions so that the largest cargo space(s) will have the same or a larger quantity of the cargo destined for the same discharging place as any of the smaller cargo spaces;

loading the separate portions of cargo at each loading place of said series of sequentially utilized loading places into their respective cargo spaces, with the loading in the largest cargo space(s) at each loading place being carried out at the same time as loading one or more of the other cargo spaces; and subsequently discharging the separate portions of cargo destined for each discharging place of said series of sequentially utilized discharging places at the respective discharging place(s), with the discharging of cargo from the largest cargo space(s) being carried out at each discharge place at the same time as the discharging of cargo from one or more of the other cargo spaces.

* * * * *